United States Patent [19]

Chigira et al.

[11] Patent Number: 4,949,253

[45] Date of Patent: Aug. 14, 1990

[54] METHOD AND APPARATUS FOR AUTOMATICALLY GENERATING PROGRAM

[75] Inventors: Eiki Chigira; Takehiro Yokoyama, both of Tokyo, Japan

[73] Assignees: Hitachi, Ltd., Tokyo; Hitachi Seibu Soft Ware Co., Ltd., Osaka, both of Japan

[21] Appl. No.: 145,989

[22] Filed: Jan. 20, 1988

[30] Foreign Application Priority Data

Jan. 23, 1987 [JP] Japan .................................. 62-13780

[51] Int. Cl.⁵ ............................................. G06F 12/00
[52] U.S. Cl. .................................... 364/200; 364/261; 364/286
[58] Field of Search ......................................... 364/200

[56] References Cited

U.S. PATENT DOCUMENTS 4,546,435 10/1985 Herbert et al. ...................... 364/300
4,604,690 8/1986 Crabtree et al. ..................... 364/200
4,712,174 12/1987 Minkler ............................... 364/200
4,730,315 3/1988 Saito et al. .......................... 364/200

Primary Examiner—Thomas M. Heckler
Attorney, Agent, or Firm—Antonelli, Terry, Stout & Kraus

[57] ABSTRACT

Automatic program generation method and apparatus in a computer program development support system having an input unit for inputting input information relating to data declaration and manner of use of data, a memory unit for storing a plurality of program part phototypes each including modifyable information and a processing unit for generating a program part from a program part prototype, wherein the input information is analyzed, one of the program part prototypes stored in the memory unit is selected in accordance with the analysis of the input information, and the selected program part prototype is substituted in accordance with the analysis of the input information to generate a program.

20 Claims, 5 Drawing Sheets

```
static struct {
            char    macroname[16];
            char    macrovalue[32];
       } macrotbl [100];
$(class)  = RETRIEVAL TABLE
$(key)    = macroname
```

FIG. 4

| # | MACRO NAME | MACRO VALUE |
|---|---|---|
| 1 | | |
| 2 | | |
| 3 | | |
| 4 | | |
| 99 | | |
| 100 | | |

FIG. 5

| MACRO NAME | MACRO VALUE |
|---|---|
| VARIABLE NAME | macrotbl |
| VARIABLE TYPE | struct |
| VARIABLE SIZE | 100 |
| ELEMENT 1 NAME | macroname |
| ELEMENT 1 TYPE | char |
| ELEMENT 1 SIZE | 16 |
| ELEMENT 1 | key |
| ELEMENT 2 NAME | macrovalue |
| ELEMENT 2 TYPE | char |
| ELEMENT 2 SIZE | 32 |
| KEY ELEMENT | 1 |
| class | RETRIEVAL TABLE |

FIG. 6

```
%class RETRIEVAL TABLE $(VARIABLE TYPE)=struct & $(VARIABLE SIZE )/=0
$(DATA DECLARATION STATEMENT)
static int    limit=-1;
$(VARIABLE NAME) _init()
{
        limit=-1;
}
%for element $( elmnum )/= $(KEY ELEMENT)
%if $(ELEMENT SIZE )/=0 & $(ELEMENT $(KEY ELEMENT) SIZE )/=0
$(ELEMENT TYPE) * $(VARIABLE NAME) _set_ $(ELEMENT NAME) (key, value)
$(ELEMENT $(KEY ELEMENT) TYPE) key[];
$(ELEMENT TYPE)  value[];
{
        if(limit >= $(VARIABLE SIZE))
                return (NULL);
        limit++;
        memcpy($(VARIABLE NAME) [limit]. $(ELEMENT $(KEY ELEMENT) NAME),
               key, $(ELEMENT $(KEY ELEMENT) SIZE));
        memcpy($(VARIABLE NAME) [limit]. $(ELEMENT NAME)
               value, $(ELEMENT SIZE));
        return (value);
}
         . . . . . . . . .
         . . . . . . . . .
%endif
%endfor
```

FIG. 7

```
static struct {
        char    macroname [16];
        char    macrovalue [32];
} macrotbl [100];
static int    limit = -1;
macrotbl_init ()
{
        limit = -1;
}
char *macrotbl_set_macrovalue(key, value)
char   key();
char   value();
{
        if (limit >= 100)
                return(NULL);
        limit++;
        memcpy(macrotbl[limit].macroname,
                key, 16);
        memcpy(macrotbl[limit].macrovalue,
                value, 32);
        return (value);
}
       . . . . . . .
       . . . . . . .
```

METHOD AND APPARATUS FOR AUTOMATICALLY GENERATING PROGRAM

BACKGROUND OF THE INVENTION

The present invention relates to method and apparatus for automatically generating program, and more particularly to method and apparatus for supporting development of a computer program by using a processing system.

An apparatus for supporting development of a computer program by using a processing system is disclosed in "System Development Support Software EAGLE", Hitach Hyoron, Vol. 66, No. 3, pages 19-24. In this apparatus, a plurality of program parts are stored as a library and selectively used in accordance with type and manner of use of data (EAGLE part library management function). In this function, a plurality of program parts are prepared as standard parts, and some of them are manually selected in accordance with the type of data to assemble a program. However, it has no function to modify the selected program parts to optimum ones in accordance with the manner of use of the data. Accordingly, it is necessary to manually add or modify the program parts of the generated program in accordance with the manner of use of the data. As a result, even if the quality and reliability of the program parts for generating the program are high, the resulting program may be of low quality and additional test and debugging are required. This renders the system development time long.

Further, since the program parts are manually selected in accordance with the manner of use and the type of the data, a man-power is required and the system development time is long because of selection time. If the number of program parts is set to be low in order to shorten the selection time, the application and utility of the program are restricted.

SUMMARY OF THE INVENTION

It is an object of the present invention to provide method and apparatus for automatically generating a program which can be used without manual addition or modification.

In order to achieve the above object, in accordance with the present invention, there is provided an automatic program generation apparatus in a computer program development support system which comprises an input unit for inputting data declaration and input information relating to manner of use of data, a memory unit for storing a plurality of program part prototypes each including modifyable information, and a processing unit for generating program parts from the program part prototypes, the input information is analyzed, one of the program part prototypes stored in the memory unit is selected in accordance with the analysis, and the selected program part prototype is modified in accordance with the analysis to generate a program.

In accordance with the present invention, (1) Not the function of the program but the data to be processed by the program and the manner of use of the data are designated to select the program part prototype, and the program is generated based on the selected program part prototype.

(2) The allowable operation is limited by the nature of data. Thus, the program part prototype for the required operation is prepared and the program part prototype is modified in accordance with the variable name, type and size of the data to generate the program. As a result, only the operation method which conforms to the nature of data is generated. Accordingly, so long as the generated program is used as it is, the data integrity is assured and the implementation is hidden externally of the program module.

(3) When the program part prototype is modified (macro substitution), not only simple substitution of macros but also conditional substitution and repetitive substitution can be performed. As a result, one program part prototype can be flexibly applied to various data and addition or modification of the program part prototype is hot required.

BRIEF DESCRIPTION OF THE DRAWINGS

FIG. 4 shows a list prepared by the designation of information shown in FIG. 3, FIG. 5 shows a data attribute list prepared by analyzing the information of FIG. 3, FIG. 6 shows a selection rule and a selected program part prototype, and FIG. 7 shows an example of a generated program.

DESCRIPTION OF THE PREFERRED EMBODIMENTS

Figures 1, 3:
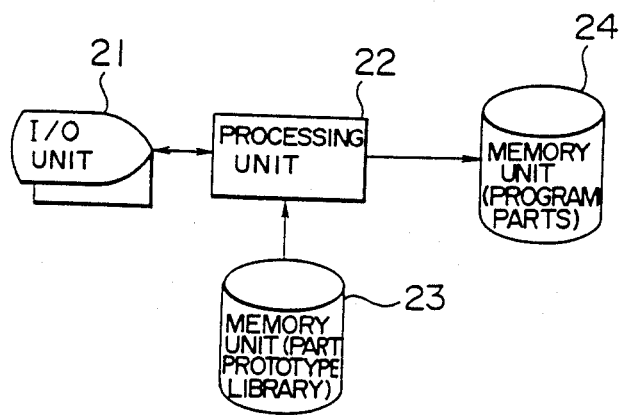
FIG. 1 shows a block diagram of a typical embodiment of an automatic program generation apparatus of the present invention.
FIG. 3 shows a typical example of information for designating a program to be generated.

FIG. 1 shows a block diagram of a typical embodiment of the automatic program generation apparatus of the present invention.

In FIG. 1, numeral 21 denotes an input/output unit which inputs data declaration and information relating to the manner of use of the data, outputs the input data and displays it, numeral 23 denotes a memory unit for storing a plurality of program part prototypes as a program part prototype library, numeral 22 denotes a processing unit for generating a program part by analyzing the input information to the input/output unit 21, selecting one of the program part prototypes from the memory unit 23 in accordance with the analysis and modifying the selected program part prototype, and numeral 24 denotes a memory unit for storing the program part generated by the processing unit 22.

The program part to be generated is designated by the processing unit 22 which receives the data to be processed by the program and the information relating to the manner of use of the data from the input/output unit 21 through a general purpose text editor and analyzes it. The processor 22 selects an appropriate program part prototype from the program part prototype library stored in the memory unit 23 in accordance with the designation, modifies it and supplies it to the memory unit 24. The input/output unit 21 can display error information of the error in the input data.

FIG. 3 shows a typical example of information for designating the program to be generated. In the present example, a list which registers names and values of macros as shown in FIG. 4 are processed. While the C language program is used in the present example for example, the present invention is applicable to other languages without regard to the program language.

In FIG. 3, information comprises data declaration statement, the manner of use of data (class), and key. In the data declaration statement exemplary shown in FIG. 3, a variable type is a structure, type of first and second elements (elements 1 and 2) are characters, name of the element 1 is macro name having a 16-byte length, name of the element 2 is macro value having a 32-byte length, a variable name is macrotbl having a variable length of 100, the manner of use or class of the data declaration statement is retrieval table and the key therefor is macroname or element 1. Thus, the information of FIG. 3 designates the preparation of a table having 100 data relating to the macro names and the macro values as shown in FIG. 4. The processing unit 22 analyzes the input information of FIG. 3 to prepare a data attribute analysis table shown in FIG. 5.

Figure 2:
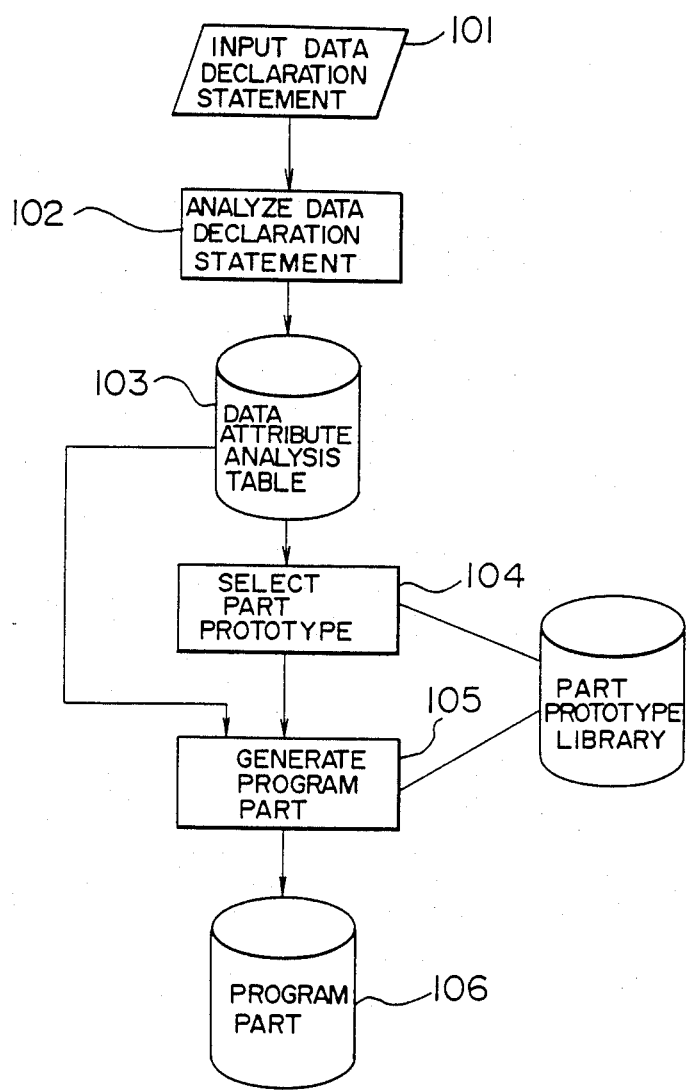
FIG. 2 is a flow chart for explaining a typical embodiment of an automatic program generation method and apparatus of the present invention.

FIG. 2 shows a flow chart for illustrating an embodiment of the automatic program generation method and apparatus of the present invention.

The operation of the present embodiment is explained with reference to the flow chart of FIG. 2. In a step 101, the processing unit 22 receives the information such as data declaration statement from the general purpose text editor of the input/output unit 21. The input information designates the data declaration statement to be processed by the program, the manner of use of the data (class) and the key where the class designates the retrieval table. In a step 102, the processing unit 22 analyzes a structure of the data declaration sentence in accordance with the designation of the program. After the analysis, the processing unit 22 prepares the data attribute analysis table shown in FIG. 5. In a step 104, the processing unit 22 selects one of the program part prototypes from the program part prototype library by referring to the analysis table. The selection criterion is based on the selection rules by the class and the variable type prepared in the part prototype library.

FIG. 6 shows the selection rule and the program part prototype selected in accordance with the selection rule. The first line of FIG. 6 shows the selection rule. The selection rule in the present embodiment is class, variable type and variable size. The selection rule determined by the data declaration statement and the class shown in FIG. 3 belongs to a class "retrieval table", in which the variable type is struct and the variable size is not zero.

The program part prototype shown in FIG. 6 matches to this selection rule. In a step 105, the processing unit 22 performs the macro substitution by using $(----) in the program part prototype as a macro name while referencing the structure analysis table shown in FIG. 5 and prepared in the step 103.

In FIG. 6, % for -- % end for indicates that each element is to be repeatedly substituted if the condition of line 8 in FIG. 6 is met. The condition of line 8 indicates that the element is not a key element or not "1". From FIGS. 3 and 5, the element 2 is not a key element but the element 1 is a key element. Accordingly, only the element 2 meets the condition and only the element 2 repeatedly develops the line 9 et seq. % if -- % endif indicates that the development of the line 9 et seq is to be performed when a condition, that is, the condition of the line 9 is met. The condition of the line 9 indicates that the element size is not zero and the element size of the first element is also not zero. In this case, the element 1 is not required to be considered. Thus, from FIGS. 3 and 5, the element size of the element 2 is 16 bytes and hence the above condition is met. Accordingly, the substitution is made only for the element 2 in the line 10 et seq.

As a result of the macro substitution or program generation in the step 105, the program part shown in FIG. 7 is generated. This program part is stored in the memory unit 24.

In FIG. 7, lines 1-4 represent the data declaration statement. The processing in {} in lines 13-22 is repeated by the variable size, that is, 100 times so that the table of FIG. 4 is prepared. Thus, the retrieval table having keys as the macro names is prepared.

As described above, since the program part of FIG. 5 has a control statement % for or information which allows modification of the program, any number of elements may be included. Further, since it has a control statement % if, any element type may be used. Furthermore, it has a control statement $( ), so that any macro name may be used.

When the program prototype is modified (macro substitution), not only the simple substitution of the macros but also conditional substitution (% if) or repetitive substitution (% for) can be carried out. Through the function, one program prototype can be flexibly applied to various data without addition or modification.

In the retrieval table used in the present embodiment, operation methods for initialization, setting and reference are generated. Whatever the number and the type of elements, the steps are similar and an appropriate program part for the data can be generated from one program part prototype. Since no manual modification or addition is required, the test of the developed program may be omitted and the productivity and reliability are improved.

While the present embodiment describes the program part when the class is the retrieval table, the present invention is not limited thereto but it can be applied to the program parts of other class.

In accordance with the present invention, a highly reliable program can be automatically generated without manual addition or modification. Further, since the program part prototype can be automatically selected in accordance with the selection rule, the productivity of the software can be significantly improved.

We claim:

1. An automatic program generation apparatus for automatically generating a program for processing data comprising:

input means for inputting input information elements representing at least a type of data to be processed by a program to be generated and a type of processing to be performed by said program to be generated;

memory means for storing a plurality of prototype parts of a program each having at least a declaration of data part and a procedure of data processing part, wherein each declaration of data and procedure of data processing parts are described by modifiable information elements which are modifiable by an associated element of said input information elements;

analyzing means for analyzing said input information elements;

selection means for selecting a prototype part of a program stored in said memory means in accordance with a result of the analyzing operation performed by the analyzing mean on said input information elements; and generation means for substituting said input information elements for modifiable information elements of said selected prototype part of a program to thereby develop said selected prototype part of a program into a part of said program to be generated.

2. An automatic program generation apparatus according to claim 1, wherein sat least one of said plurality of prototype parts of a program further includes at least one control statement for controlling flow of a procedure of data processing part thereof, said control statement being described by modifiable information elements each being modifiable by an associated one of said input information elements, said generation means includes first means for modifying the control statement by substituting associated input information elements for the modifiable information elements of the control statement, second mean for developing an associated part of the procedure of data processing part in accordance with a condition defined by the modified control statement to thereby obtain a developed prototype part of a program having the procedure of data processing part with the developed associated part and the data declaration of data part, and third means for substituting associated input information elements for the modifiable information elements of the developed prototype part of a program thereby obtaining said program part of said program to be generated.

3. An automatic program generation apparatus according to claim 2, wherein said control statement is for repeatedly developing the associated part of the procedure of data processing part of said prototype part of a program;

said generation means further includes judging means for judging whether development of the associated part of the procedure of data processing part is to be performed repeatedly in accordance with the condition defined by the modified control statement; and said second means, when said judging means judges that the development is to be performed repeatedly, repeatedly develops the associated part of the procedure of data processing part in accordance with the condition defined by the modified control statement to obtain the developed prototype having the procedure of data processing part with repeatedly developed associated part and the declaration of data part.

4. An automatic program generation apparatus according to claim 3, wherein a range of the associated part of the procedure of data processing part and a number of repetitions of development are defined by the condition of the modified control statement.

5. An automatic program generation apparatus according to claim 2, wherein said control statement is for developing only once, the associated part of the procedure of data processing part of said prototype part of a program;

said generation means further includes judging means for judging whether development of the associated part of the procedure of data processing part is to be performed once in accordance with the condition defined by the modified control statement; and said second means, when said judging means judges that the development is to be performed once, develops the associated part of the procedure of data processing part only once in accordance with the condition defined by the modified control statement to obtain the developed prototype part of a program having the procedure of data processing part with a developed associated part and the data declaration of data part.

6. An automatic program generation apparatus according to claim 5, wherein a range of the associated part of the procedure of data processing part is defined by the condition of the modified control statement.

7. An automatic program generation apparatus according to claim 1, wherein said input information elements have a selection rule and each prototype part of a program has a selection rule; and said selection means includes means for comparing the selection rule of the input information elements with the selection rules of said prototype parts of a program and means for selecting a prototype part of a program whose selection rule coincides with the selection rule of the input information elements.

8. An automatic program generation apparatus according to claim 7, wherein each of said selection rules has an information element representing a type of processing to be performed by said program to be generated.

9. An automatic program generation apparatus according to claim 8, wherein each of said selection rules further has at least one information element representing a type of data.

10. An automatic program generation apparatus according to claim 1, wherein one of said modifiable information elements is a macro name.

11. An automatic program generation method for automatically generating a program for processing data, comprising the steps of:

inputting input information elements representing at least a type of data to be processed by a program to be generated and a type of process to be performed by said program to be generated;

storing, in a memory, a plurality of prototype parts of a program each having at least a declaration of data part and a procedure of data processing part wherein each declaration and procedure parts are described by modifiable information elements which are modifiable by an associated element of said input information elements;

analyzing said input information elements;

selecting a prototype part of a program stored in said memory in accordance with a result of said analyzing step; and substituting said input information elements for modifiable information elements of said selected prototype part of a program to thereby develop said selected prototype part of a program into a part of said program to be generated.

12. An automatic program generation method according to claim 11, wherein at least one of said plurality of prototype parts of a program further includes at least one control statement for controlling flow of a procedure of data processing part thereof, said control statement being described by modifiable information elements each being modifiable by an associated one of said input information elements; and said substituting step further includes the steps of modifying the control statement by substituting associated input information elements for the modifiable information elements of he control statement, developing an associated part of the procedure of data processing part in accordance with a condition defined by the modified control statement to thereby obtain a developed prototype part of a program having the procedure of data processing part with the developed associated part and said data declaration of data part, and substituting associated input information elements for the modifiable information elements of the developed prototype part of a program, thereby obtaining said program part of said program to be generated.

13. An automatic program generation method according to claim 12, wherein said control statement is for repeatedly developing the associated part of the procedure of data processing part of said prototype part of a program said substituting part further includes the steps of judging whether development of the associated part of the procedure of data processing part is to be performed repeatedly in accordance with the condition defined by the control statement; and said developing step includes a step of repeatedly developing the associated part of the procedure of data processing part in accordance with the condition defined by the modified control statement to obtain the developed prototype having the procedure of data processing part with the repeatedly developed associated part and the declaration of data part, when the judging step judges that the development is to be performed repeatedly.

14. An automatic program generation method according to claim 13, wherein a range of the associated part of the procedure of data processing part and a number of repetitions of development are defined by the condition of the modified control statement.

15. An automatic program generation method according to claim 12, wherein said control statement is for developing, only once, the associated part of the procedure of data processing part of said prototype part of a program;

wherein said substituting step further includes the steps of judging whether development of the associated part of the procedure of data processing part is to be performed once in accordance with the condition defined by the modified control statement; and wherein said developing step includes the step of developing the associated part of the procedure of data processing part, only once, in accordance with the condition defined by the modified control statement to obtain the developed prototype part of a program having the procedure of data processing part with a developed associated part and the declaration of data part, when the hedging step judges that the development is to be performed only once.

16. An automatic program generation method according to claim 15, wherein a range of the associated part of the procedure part is defined by the condition of the modified control statement.

17. An automatic program generation method according to claim 11, wherein said input information elements having a selection rule and each prototype part of a program has a selection rule; and said selecting step includes the steps of comparing the selection rule of the input information elements with the selection rules of the prototype parts of a program, and selecting a prototype part of a program whose reelection rule coincides with the selection rule of the input information elements.

18. An automatic program generation method according to claim 17, wherein each of said selection rules has an information element representing a type of processing to be performed by said program to be generated.

19. An automatic program generation method according to claim 18, wherein each of said selection rules further has at least one information element representing a type of data.

20. An automatic program generation method according to claim 11, wherein one of said modifiable information elements is a macro name.

* * * * *